H. C. GIBSON.
WHEEL.
APPLICATION FILED MAR. 16, 1907. RENEWED MAR. 17, 1916.
1,204,658.
Patented Nov. 14, 1916.
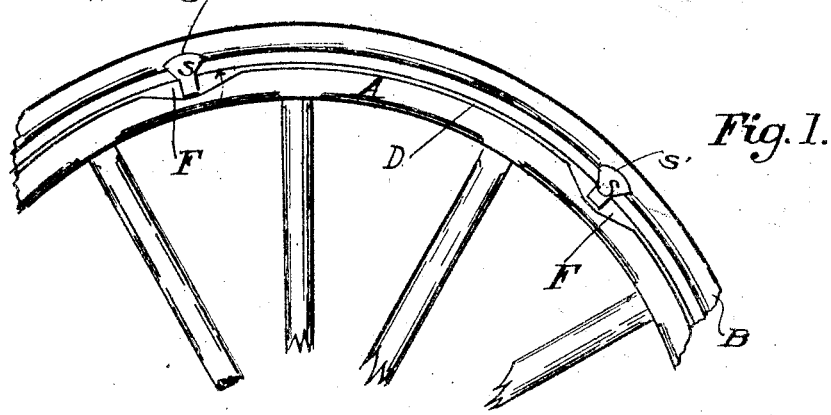
Fig. 1.
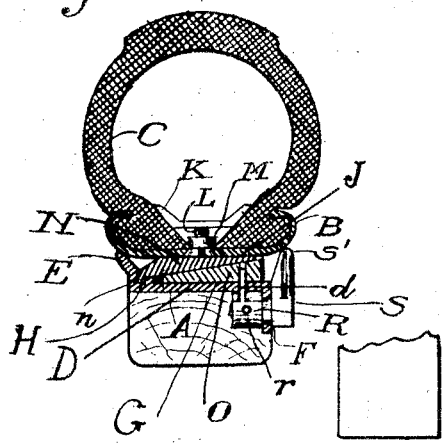
Fig. II
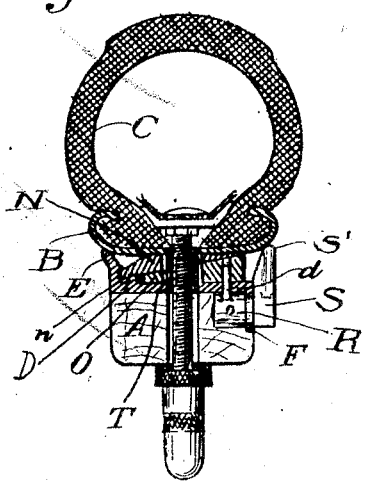
Fig. III
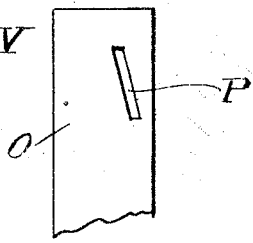
Fig. IV
WITNESSES:
H. Muchmore
Coker F. Clarkson
INVENTOR
Hugo C. Gibson
BY
Hermann Hunt
his ATTORNEY

UNITED STATES PATENT OFFICE.

HUGO C. GIBSON, OF NEW YORK, N. Y.

WHEEL.

1,204,658.   Specification of Letters Patent.   Patented Nov. 14, 1916.

Application filed March 16, 1907, Serial No. 362,727. Renewed March 17, 1916. Serial No. 84,954.

*To all whom it may concern:*

Be it known that I, HUGO C. GIBSON, a British subject, residing in the borough of Manhattan, city and State of New York, have invented certain new and useful Improvements in Wheels, of which the following is a full and clear description, reference being had to the accompanying drawings.

The invention relates to wheels, and more particularly to means for attaching the tire portion to the wheel proper; and the particular object pertains to means for attaching an inflated tire to a felly in a manner affording security and ready mounting, and detachability with simplicity of construction, strength and economy of construction.

My invention is more particularly set forth by reference to a specific embodiment, which I now fully describe with reference to the drawings hereto appended and forming a part hereof, changes or modifications from this specific form may be made without departing from my invention as hereinafter claimed.

In the drawings, Figure I. is a side view of part of a wheel, without tire, and with spokes partly broken away; Fig. II. is a section of felly and adjacent parts, with tire of what is known as the "clencher" type, showing means of attachment of tire shoe or cover to its rim; Fig. III. is a section of felly with completely detachable rim and the attaching means, showing the valve stem of the tire passing through the felly and other parts; Fig. IV. is a view from the under side of the adjacent ends of the split ring locking or attaching band.

The form of my invention thus illustrated consists essentially of the felly A, the rim B with its tire C. On the felly is secured a band D, along one edge of which is a ridge E, while on the opposite side is a flange F, extending inwardly beside the felly. This flange F is herein shown as interrupted, that is in sections, at a number of places. The seat G of the felly band I prefer to make cylindrical and may have a groove H close to the felly in any desired manner.

The seat J, of the rim B is cylindrical, and the tire C is attached to the rim by means of lugs K, the stems L of which are engaged by lug nuts M, the heads of which are countersunk, leaving the seat J flush. Between the rim seat J, and felly band seat G, are two bands which I will call the clamping band N and the locking band O, each having one face cylindrical and the other tapered, whereby both bands coöperate as wedges. Band N is split transversely, and as shown has a lip $n$ registering with the groove H. Band O has a plurality of slots P obliquely disposed. Engaging with each slot is a stud or like part $d$, projecting through band D, forming part of or operated by a locking block R. The latter consists of a shank projecting laterally under the band D, and the head S with an enlargement S' on one side.

It will thus be seen that my completely removable rim with tire on and inflated can be attached to the wheel proper by moving it laterally over the felly with its band when the locking band O is withdrawn, that is, moved to the right relative to the clamping band as shown in the figures of section. After rim and tire have been moved into place, that is, moved to the left so that the rim engages the ridge E, stopping the rim in the desired position, they are secured. The securing is effected by turning the head S of the locking blocks by any convenient means preferably a special tool or ordinary wrench, and the action of turning revolves the stud $d$ in the oblique groove P in the locking band O, whereby the band O is forced laterally, and by the wedging action, owing to its engagement with the clamping band N, it expands this band, thereby securely clamping or mechanically locking the tire with its rim B, to the felly band D. The feature in my preferred form of a band N which is expanded has the added advantage of contracting when band O is withdrawn, thereby freeing itself from and completely loosening the completely detachable rim immediately. The positioning ridge E in my preferred form as shown more securely locates the rim, and has the added advantage of protecting the clamping parts on that side from mud, dust or water. This feature is of importance when considered with the arrangement of locking bands and concealed locking means, the location of which latter is away from dirt and water, and therefore free from the objections to various other forms of tire rim attaching construction.

The enlargement S' on the head of the locking block engages one edge of the rim B on the opposite side from the felly positioning ridge E, and this engagement including in my preferred form a slight roughness on the inner face of S', results in engagement preventing the rotation of the locking block, unless the same is forcibly rotated by the means used for setting it up. This attachment or clamping I term "setting-up." The locking band and consequently its slots are positioned by registering of valve tube T, hereinafter described or by other suitable means. It will be seen that in the act of setting-up, the clamping band O will tightly contract on the seat G of the felly band D, while the setting-up will expand the clamping band N, and cause it to securely bind on the seat J, being the inner surface of the completely detachable rim. In order to remove the rim and tire, the locking blocks, of which there are a plurality at intervals around the felly, are turned half around so that the enlargement S' is out of the way, and no portion of the head S projects to a sufficient extent to interfere with the lateral removal of the completely detachable rim and tire. This rotation of the locking blocks effects by means of the stud or cam member d, a withdrawal of the locking band O, and the band N being held through the lip n, engaging with the groove H, the disengaging of the conical band surfaces permits the contraction of the band N, whereupon the rim with its tire is free and may be laterally removed.

While many details of construction or variations are possible, in my preferred form I use clamping and locking bands of rolled steel, while the conical surfaces or faces may be finished in order to permit of more free movement in setting-up, and in my preferred form I likewise may not machine the cylindrical face of each of the bands as unmachined they more securely bind with the seat of the rim and the seat of the felly band respectively.

It will be seen that I can employ any form of rim with its pneumatic tire inflated before-hand and comprising a unit ready for use. As shown in Fig. III a long stem valve may be used and the attachment of the tire is effected by first passing the long stem valve through the hole in the securing bands and the hole in the felly, after which insertion the tire then seated at one side is laterally pushed onto the rim at the opposite side of the wheel. In my preferred form I employ a tube T around the valve stem hole, secured to the wheel rim B, which as herein shown upon insertion passes through holes or transverse slots in the securing bands and into a hole in the felly band. This secures registering of these parts at valve hole and relieves strain or abrasion from the valve stem itself. The hole through the felly proper is made sufficiently larger than the valve stem so that the slight tilting necessary when mounting this form of construction, can be readily effected.

While certain parts of my invention may be embodied without respect to the flush tire attaching lug nut M, when the latter is used the nut protrudes on the upper side of the rim and the threaded shank or lug stem passes into it in a manner as will be seen by reference to Fig. II, affording a sufficient number of threads to securely hold the lug, whereas the protruding nut affords a ready means of finding its location when inserting and clamping the tire C to the rim B.

While the locking block, as shown in my preferred construction, has the stud d passing through a straight slot in the felly band D, and engaging with the edge of the slot in the felly band, thereby bringing the shearing strain of the locking stud directly between the locking band O and the felly band D, this construction may be modified so that resistance against lateral movement of R may be afforded by engagement of the shank of R in a manner as shown in one form against the flange F, of the felly band D. In this latter construction the prolonged stud or cam affords a greater shearing strength, and being less than 180 degrees permits entire disengagement from the band O of the locking stud. It also effects more securely, readily and effectively the releasing or setting-up of the locking band.

It will be seen that in my preferred form it is possible, owing to the cylindrical seat on the completely detachable rim, to mount the rim and tire either side first, which means that the seat of the rim must be symmetrical about the medial plane of the rim as a whole, which has its marked advantages. The ridge E being permanent and being on the felly band conforms to practical requirements, because in view of the difference in the two ends of the hub in a wheel, wheels are invariably one-sided, and even one-sidedness of the felly band by way of an inclined seat is therefore not objectionable.

It will thus be seen that my invention affords the greatest facility in the ready and quick removal or attachment of a previously inflated tire to a wheel, and at the same time is a simple and inexpensive construction, and when attachment is effected has the result of most positively locking the completely detachable rim and tire to the wheel, in a manner most effective to resist the great strain to which such tire shod wheels are subjected, as in the use of high-speed and high-powered automobiles.

While various modifications in detail or arrangement of my invention are possible, including under certain conditions omission of some of the elements shown and described in the specific form herewith illustrated, I do not therefore wish to limit myself to what is specifically shown and described, but

What I claim and desire to secure by Letters Patent, is—

1. A wheel comprising a removable rim carrying a tire and having a cylindrical seat, a felly band having a seat, a fixed positioning ridge at one side of said seat, and means for securing said removable rim to said felly band including an independent band having a conical shaped surface, said band being located between the cylindrical portion of the rim seat, and the felly band seat, and means on the side of said seat opposite to the fixed ridge for locking in engagement and positively moving said independent band in both directions laterally, relative to said cylindrical seat.

2. A wheel comprising a removable rim carrying a tire and having a cylindrical seat, a felly band having a seat, an integral ridge on one side of said seat, and means for securing said removable rim to the felly band, including coöperating securing bands located between said cylindrical seat and said seat on the felly band, and means for locking and positively moving one band laterally relative to the other in coöperation with said fixed ridge, whereby a positive clamping action is secured and whereby a positive releasing movement may be had.

3. A wheel comprising a removable rim carrying a tire and having a cylindrical seat, a felly band having a seat, a ridge on one side of said felly band, coöperating securing bands each of which is provided with a conical surface located between the rim and felly band seat, one of said bands adapted to engage the ridge on the seat and a series of clamps on the other side of the felly band from the ridge, adapted to laterally move the other of said securing bands to lock said rim in position.

4. A wheel comprising a removable rim, carrying a tire and having a cylindrical seat, a felly band having a seat, a fixed positioning ridge on one side of said felly band, coöperating securing bands located between said removable rim and said felly band, means on the opposite side of said felly band from the positioning ridge for locking and unlocking said removable rim, and means for positively moving one of said coöperating bands relative to the other and clamping the removable rim on said felly band.

5. A wheel comprising a removable rim carrying a tire and having a cylindrical seat, a felly band having a seat, coöperating securing bands having conical opposing faces in contact located between said rim and said felly band, the upper surface of said band being in contact with the rim seat, and the lower surface of the other band being in contact with the felly band seat, and means for forcing the lower of said bands into locking position, the upper band having a lip engaging a groove in the felly band for preventing lateral movement thereof.

6. A wheel comprising a removable rim carrying a tire, and having a seat, a felly band having a seat, coöperating securing bands having conical opposing faces in contact, the upper surface of one of said bands being in contact with the rim seat and the lower surface of the other band being in contact with the felly band seat, and means for positively moving one of said bands relative to the other, including a plurality of securing lugs, projections carried by said lugs, said movable band having cam surfaces coöperating with the projections on said lugs.

7. A wheel comprising a removable rim carrying a tire and having a cylindrical seat, a felly band having a seat, means for securing said rim to said felly band including coöperating locking bands, said felly band having a groove engaging a lip on one of said locking bands for preventing the lateral movement thereof, said felly band having a ridge engaging one side of said removable rim, locking lugs mounted on the opposite side of the felly from said ridge, each of said lugs being provided with an enlargement for engaging the opposite side of said rim, projections carried by said locking lug, and cam surfaces formed on the movable locking band and engaging the projections on said lugs.

8. A wheel comprising a removable rim carrying a tire, a cylindrical seat on said rim, a felly band having a seat, an integral ridge around one side of said felly band constituting a lateral fixed abutment for the securing means and positioning the rim, a movable locking band between the rim and said felly band forced between the same from the side opposite to the integral ridge, a plurality of clamps to force said band into locking position located on the side of the wheel opposite to the integral ridge.

9. A wheel comprising a removable rim carrying a tire, a felly band on the wheel, a securing band conical in section adapted to be inserted from one side between the felly band and the removable rim, and an integral ridge on the opposite side of the felly band adapted to be engaged by the opposite side of the removable rim, a plurality of locking devices adapted to force the securing band into position, and coöperating means adapted to prevent lateral movement of the removable rim when the securing band is in locking position.

10. A wheel comprising a removable rim carrying a tire, a felly band of lesser diameter than the interior diameter of the removable rim, and having an integral ridge on one side of said band projecting radially and having a portion of said ridge of greater diameter than the diameter of the removable rim near its edge to constitute a lateral fixed abutment for said rim, a locking means on the opposite side of the felly band coöperating to engage the opposite side of the removable rim, and to effect radial pressure between the felly and the rim, and including a band having a wedge-shaped section, a plurality of clamps, whereby the wedge-shaped band can be forced to lock the removable rim on the side of the wheel opposite the integral ridge of the felly band.

11. A wheel comprising a removable rim carrying a tire, a felly band of lesser diameter than the interior diameter of the rim, but having a ridge on one side of slightly greater diameter, a wedge-shaped sectional band adapted for insertion from the other side of the rim to lock the felly and rim and close the aperture on that side between the felly and rim, and a plurality of clamps to force said band into locking position and means coöperating therewith to engage the edge of the rim.

12. A wheel comprising a tire supported on a removable rim of substantially equal internal diameter on either side whereby it is interchangeable side for side for purposes of mounting, a felly band of lesser diameter but having an integral ridge on one side of slightly greater diameter than the interior diameter of the removable rim, a removable band adapted to be inserted between the rim and the felly band on the opposite side from the integral ridge, and a plurality of clamps coöperating to lock said rim radially and laterally in coöperation with said integral ridge.

13. A wheel comprising a removable rim adapted to carry a tire, a felly band of diameter throughout its width less than the interior diameter of the removable rim, but having on one side an outwardly projecting ridge of greater maximum diameter to serve for engagement with one side of the rim to laterally position the same, means on the opposite side of the felly and coöperating therewith to effect radial pressure between the felly and the rim, and separate means laterally engaging the rim, whereby entire rim and tire may be readily held secure on the felly or readily removed, for the purpose described.

Signed at New York, this fifteenth day of March, 1907.

HUGO C. GIBSON.

Witnesses:
 COKER F. CLARKSON,
 EUGENE J. HAZARD.